(12) United States Patent
Hinchberger (10) Patent No.: US 10,240,675 B2
(45) Date of Patent: Mar. 26, 2019

(54) FLUID SEAL AND METHOD OF SEALING A GAS CONTAINMENT SYSTEM

(71) Applicants: Red Leaf Resources, Inc., South Jordan, UT (US); Total E&P USA Oil Shale, LLC, Houston, TX (US)

(72) Inventor: Sean Hinchberger, South Jordan, UT (US)

(73) Assignee: Red Leaf Resources, Inc., Salt Lake City, UT (US)

( * ) Notice: Subject to any disclaimer, the term of this patent is extended or adjusted under 35 U.S.C. 154(b) by 560 days.

(21) Appl. No.: 14/880,727

(22) Filed: Oct. 12, 2015

(65) Prior Publication Data

US 2016/0102763 A1    Apr. 14, 2016

Related U.S. Application Data

(60) Provisional application No. 62/062,687, filed on Oct. 10, 2014.

(51) Int. Cl.
| | |
|---|---|
| *C10G 1/02* | (2006.01) |
| *F16J 15/02* | (2006.01) |
| *F16J 15/14* | (2006.01) |

(52) U.S. Cl.
CPC .............. *F16J 15/14* (2013.01); *C10G 1/02* (2013.01); *F16J 15/02* (2013.01); *F16J 15/021* (2013.01); *F16J 15/022* (2013.01); *F16J 15/024* (2013.01)

(58) Field of Classification Search
CPC  F16J 15/14; F16J 15/021; F16J 15/022; F16J 15/024; F16J 15/02; C10G 1/02
See application file for complete search history.

(56) References Cited

U.S. PATENT DOCUMENTS

| | | |
|---|---|---|
| 3,918,233 A | 11/1975 | Simpson |
| 4,370,003 A | 1/1983 | Kvapil et al. |

(Continued)

FOREIGN PATENT DOCUMENTS

| | | |
|---|---|---|
| DE | 10127493 A1 | 12/2002 |
| EP | 1767704 A1 | 3/2007 |

(Continued)

OTHER PUBLICATIONS

Benson et al., Test Section Installation Instructions Alternative Cover Assessment Program, Environmental Geotechnics Report No. 99-3, Dec. 17, 1999, Univ. of Wisconsin-Madison, Madison, Wisconsin.

(Continued)

*Primary Examiner* — Randy Boyer
*Assistant Examiner* — Juan C Valencia
(74) *Attorney, Agent, or Firm* — Thorpe North & Western, LLP (57) ABSTRACT

A fluid seal system for a hydrocarbon recovery capsule includes a plurality of interconnected fluid seals each comprising an elongated sealing member clamped to a bulkhead plate and biasing a geomembrane to the bulkhead plate. A compression plate is positioned between each elongated sealing member and the bulkhead plate, thereby clamping the geomembrane to the bulkhead plate. An enclosed channel of each elongated sealing member receives a slurry. Clay amended soil surrounds and compresses the plurality of interconnected seals to provide a fluid seal that is capable of withstanding high temperatures while sealing off fluid and gas from the environment. A method of sealing a hydrocarbon recovery capsule is disclosed and described.

14 Claims, 5 Drawing Sheets

(56) References Cited

U.S. PATENT DOCUMENTS

| | | | |
|---|---|---|---|
| 4,461,707 | A | 7/1984 | Thayer et al. |
| 4,682,911 | A | 7/1987 | Moreland |
| 4,697,954 | A | 10/1987 | Grund |
| 5,580,185 | A | 12/1996 | Ware |
| 5,806,252 | A | 9/1998 | Scuero |
| 6,612,779 | B1 | 9/2003 | Scuero |
| 6,619,879 | B1 | 9/2003 | Scuero |
| 8,291,668 | B2 | 10/2012 | Iske et al. |
| 8,366,918 | B2 | 2/2013 | Dana et al. |
| 2011/0176876 | A1 | 7/2011 | Scuero |

FOREIGN PATENT DOCUMENTS

| | | | |
|---|---|---|---|
| EP | 2322722 | * | 5/2011 |
| EP | 2322722 A1 | | 5/2011 |
| WO | WO2011057996 A1 | | 5/2011 |

OTHER PUBLICATIONS

Deyer et al., Engineering Evaluation Report—Harbor Point Development Exelon Tower, MRCE File No. 11896A-40, Aug. 8, 2013, Mueser Rutledge Consulting Engineers.

Ladd et al., Laboratory Studies for Determining Flexible-Membrane Soil Bedding Requirements, EPA, Sep. 1983, p. 128.

* cited by examiner

FLUID SEAL AND METHOD OF SEALING A GAS CONTAINMENT SYSTEM

RELATED APPLICATIONS

This application claims the benefit of U.S. Provisional Patent Application Ser. No. 62/062,687, filed on Oct. 10, 2014, which is incorporated herein by reference in its entirety.

BACKGROUND

Figure 1:
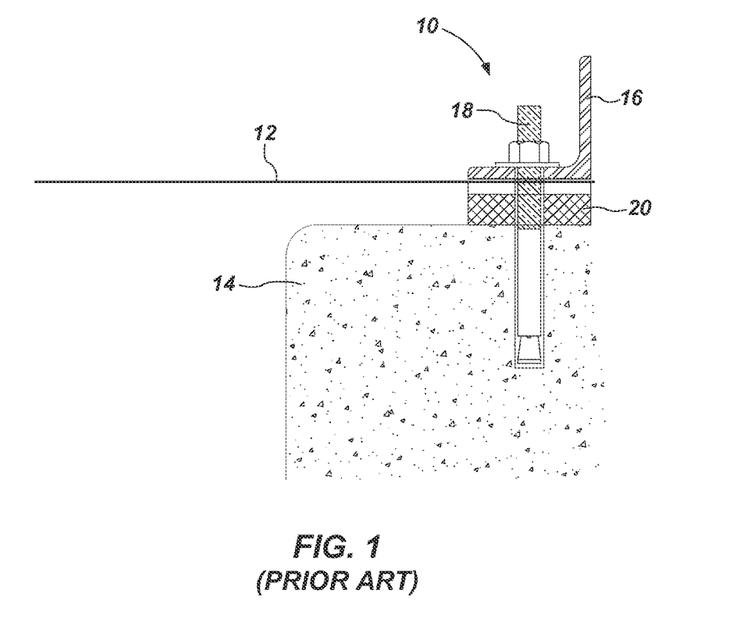
FIG. 1 shows a typical connection system between a geomembrane and a structure known in the prior art.

Recovery of hydrocarbon products from certain hydrocarbonaceous materials can be achieved through various processes including vertical retorts, in situ processes, and more recently developed massive encapsulated impoundments (i.e. In-Capsule® process). Hydrocarbon recovery capsules can include piled hydrocarbonaceous materials (i.e., ore) encapsulated in a gas tight clayey soil and geosynthetic barrier system with perimeter rock-fill containment berms. The recovery capsules may be many acres in size and in some cases are partially recessed or embedded in the earth. A geomembrane often surrounds the gas tight clayey soil and encapsulates gases within the recovery capsule. Heating and gas collection pipes enter the recovery capsule through a bulkhead plate (such as a steel plate) adjacent the geomembrane. Hydrocarbon is extracted from the recovery capsule by heating hydro carbonaceous materials within the recovery capsule, causing pyrolysis leading to gas and liquid hydrocarbon production. The gas and liquid hydrocarbon is collected for further processing into petroleum products and associated by-products. Typically, the temperatures of the pipes and the internal area of the capsule can reach upwards of 900 degrees Fahrenheit, or even higher. Exposure to high temperatures of the gas containment system and the bulkhead interconnection can cause desiccation of clayey materials and heating of the attached geomembrane beyond its transition temperature. These effects may damage the gas containment layers near the connection between the bulkhead plate, the geomembrane, and a surrounding structure (FIG. 1), which can lead to gas leakage that is dangerous to humans and the environment. Furthermore, the process of heating the hydrocarbonaceous materials within the capsule and extracting hydrocarbons produces liquids and gasses that often come in contact with the gas containment system and the interconnection between the geomembrane and the bulkhead plate. Such fluids are known to cause degradation of clayey and geomembrane materials. FIG. 1 shows a typical interconnection between a bulkhead plate, a geomembrane, and a structure, which is prone to failure and/or fluid leakage.

SUMMARY

The present technology provides a fluid seal and sealing system with an overlapping layer of glycerin and clay amended soil (GCAS) that creates a gas tight seal for an encapsulated hydrocarbon recovery capsule.

Figure 2:
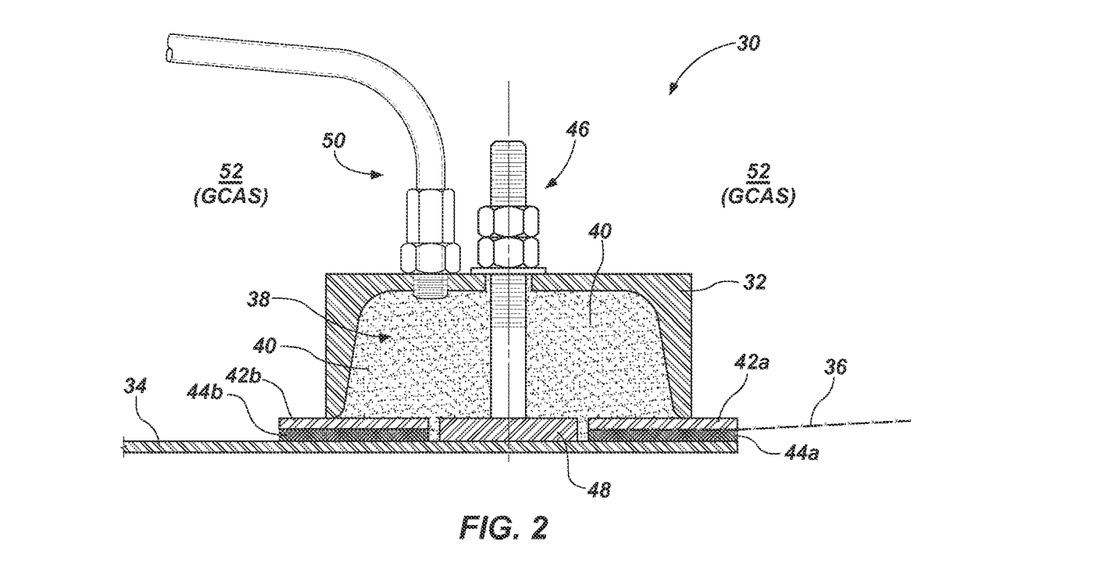
FIG. 2 shows a fluid seal and fluid sealing system according to an embodiment of the present invention.

In one exemplary embodiment, a fluid seal includes an elongated sealing member (e.g., a steel C-channel) attached to a bulkhead plate. The elongated sealing member biases or clamps a geomembrane to the bulkhead plate. An enclosed channel is defined by the elongated sealing member and the bulkhead plate. The channel is adapted to receive a slurry to assist with providing a fluid tight seal for the material recovery capsule. In some aspects the slurry is comprised of glycerin-water, bentonite, and cement, or a combination thereof. In some aspects, a compression plate is positioned between the elongated sealing member and the bulkhead plate, and a gasket is positioned between the compression plate and the bulkhead plate. Thus, the geomembrane is positioned between the gasket and the compression plate (FIG. 2). Additional optional compression plates and gaskets may be provided. The elongated sealing member is clamped to the bulkhead plate by a fastener extending through the channel, or it may be attached to the bulkhead by other suitable fasteners. In some aspects, a fluid conduit is coupled to the elongated sealing member and extends into the channel to deliver the slurry into the channel after the elongated sealing member is clamped to the bulkhead plate. A compacted layer of clay amended soil surrounds an outer perimeter area of the elongated sealing member and the bulkhead plate. The clay amended soil is compressed by ore within the hydrocarbon recovery capsule, thereby compressing the fluid seal and causing glycerin and water to be squeezed from the GCAS onto, and all around, the fluid seal, rendering the interface between the geomembrane and the bulkhead plate fluid tight.

The present technology provides a material recovery system comprising a fluid seal system. In one embodiment, the fluid seal system can include four fluid seals (such as described above and elsewhere in this application), which are interconnected to each other and surrounding at least one pipe extending through the bulkhead plate. The four fluid seals clamp or bias the geomembrane to a perimeter area of the bulkhead plate. A compacted layer of clay amended soil surrounds an outer perimeter area of the elongated sealing members and the bulkhead plate.

The present technology also provides a material recovery system including a material recovery capsule having a gas containment system defining an interior volume of the material recovery capsule. A bulkhead plate is adjacent the gas containment system and has an aperture and a perimeter area. At least one pipe extends through the aperture in the bulkhead plate and into the material recovery capsule. A geomembrane overlies the perimeter area of the bulkhead plate and lays exterior of the gas containment system. A fluid seal comprising an elongated sealing member is attached to the bulkhead plate around the perimeter area and biases or clamps the geomembrane to the bulkhead plate. The fluid seal can be a single elongated member surrounding the bulkhead plate, or multiple elongated members (e.g., four) interconnected and sealed to each other. An enclosed channel is defined between the elongated sealing member(s) and the bulkhead plate. The channel is filled with slurry that assists to provide a fluid tight seal for the material recovery capsule. A compacted layer of clay amended soil surrounds an outer perimeter area of the elongated sealing member(s) and the bulkhead plate.

A method of sealing a material recovery capsule involves biasing or clamping a geomembrane to a bulkhead plate with a fluid seal. The fluid seal includes an elongated sealing member attached to the bulkhead plate. The method includes introducing a slurry into an enclosed channel defined by the elongated sealing member and the bulkhead plate to assist with providing a fluid tight seal between the geomembrane and the plate. The method also involves attaching at least one fluid seal to the bulkhead plate before introducing the slurry. Thus, the at least one fluid seal surrounds the at least one pipe and biases or clamps the geomembrane to the bulkhead plate. The method involves positioning at least one compression plate between the elongated sealing member and the bulkhead plate, and positioning at least one gasket between the compression plate and the bulkhead plate. The method involves clamping the elongated sealing member to the bulkhead with at least one fastener, whereby the elongated sealing member, along with the bulkhead plate, defines the channel that receives the slurry. The step of introducing the slurry comprises fluidly coupling a fluid conduit to the elongated sealing member and dispensing the slurry into the channel. The method involves positioning a compacted layer of clay amended soil over the bulkhead plate and the fluid seal(s), thereby providing a fluid seal between the geomembrane and the bulkhead plate to prevent fluid leaks and/or degradation.

There has thus been outlined, rather broadly, the more important features of the invention so that the detailed description thereof that follows may be better understood, and so that the present contribution to the art may be better appreciated. Other features of the present invention will become clearer from the following detailed description of the invention, taken with the accompanying drawings and claims, or may be learned by the practice of the invention.

These drawings are provided to illustrate various aspects of the invention and are not intended to be limiting of the scope in terms of dimensions, materials, configurations, arrangements or proportions unless otherwise limited by the claims.

DETAILED DESCRIPTION

While these exemplary embodiments are described in sufficient detail to enable those skilled in the art to practice the invention, it should be understood that other embodiments may be realized and that various changes to the invention may be made without departing from the spirit and scope of the present invention. Thus, the following more detailed description of the embodiments of the present invention is not intended to limit the scope of the invention, as claimed, but is presented for purposes of illustration only, and not limitation, to describe the features and characteristics of the present invention, to set forth the best mode of operation of the invention, and to sufficiently enable one skilled in the art to practice the invention. Accordingly, the scope of the present invention is to be defined solely by the appended claims.

Definitions

In describing and claiming the present invention, the following terminology will be used.

The singular forms "a," "an," and "the" include plural referents unless the context clearly dictates otherwise. Thus, for example, reference to "a fastener" includes reference to one or more of such devices and reference to "subjecting" refers to one or more such steps.

As used herein with respect to an identified property or circumstance, "substantially" refers to a degree of deviation that is sufficiently small so as to not measurably detract from the identified property or circumstance. The exact degree of deviation allowable may in some cases depend on the specific context.

As used herein, "adjacent" refers to the proximity of two structures or elements. Particularly, elements that are identified as being "adjacent" may be either abutting or connected. Such elements may also be near or close to each other without necessarily contacting each other. The exact degree of proximity may in some cases depend on the specific context.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Concentrations, amounts, and other numerical data may be presented herein in a range format. It is to be understood that such range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited. For example, a numerical range of about 1 to about 4.5 should be interpreted to include not only the explicitly recited limits of 1 to about 4.5, but also to include individual numerals such as 2, 3, 4, and sub-ranges such as 1 to 3, 2 to 4, etc. The same principle applies to ranges reciting only one numerical value, such as "less than about 4.5," which should be interpreted to include all of the above-recited values and ranges. Further, such an interpretation should apply regardless of the breadth of the range or the characteristic being described.

As used herein, the term "at least one of" is intended to be synonymous with "one or more of" For example, "at least one of A, B and C" explicitly includes only A, only B, only C, and combinations of each (e.g. A+B, B+C, A+C, and A+B+C).

Any steps recited in any method or process claims may be executed in any order and are not limited to the order presented in the claims. Means-plus-function or step-plus-function limitations will only be employed where for a specific claim limitation all of the following conditions are present in that limitation: a) "means for" or "step for" is expressly recited; and b) a corresponding function is expressly recited. The structure, material or acts that support the means-plus function are expressly recited in the description herein. Accordingly, the scope of the invention should be determined solely by the appended claims and their legal equivalents, rather than by the descriptions and examples given herein.

The foregoing detailed description describes the invention with reference to specific exemplary embodiments. However, it will be appreciated that various modifications and changes can be made without departing from the scope of the present invention as set forth in the appended claims. The detailed description and accompanying drawings are to be regarded as merely illustrative, rather than as restrictive, and all such modifications or changes, if any, are intended to fall within the scope of the present invention as described and set forth herein.

FIG. 1 is a typical connection system 10 between a geomembrane 12 and a structure 14, as known with existing systems. Such a connection system is typically employed either on its own or in conjunction with a compacted clay amended soil (CAS) or natural clayey soil in an attempt to produce a fluid tight system. The system 10 includes an angle bar 16 fastened to the structure 14 by a fastener 18, such as a wedge type anchor bolt with a nut and washer. Clamped between the angle bar 16 and the structure 14 is the geomembrane 12 and a gasket 20. This connection is susceptible to advective gas transport at the interconnection along the geosynthetic-soil and geosynthetic-structure interfaces of gas containment systems, which often results in leaks and/or failure of the connection system. This can be quite hazardous to humans and the environment, and leads to loss of potentially valuable product.

Figure 3:
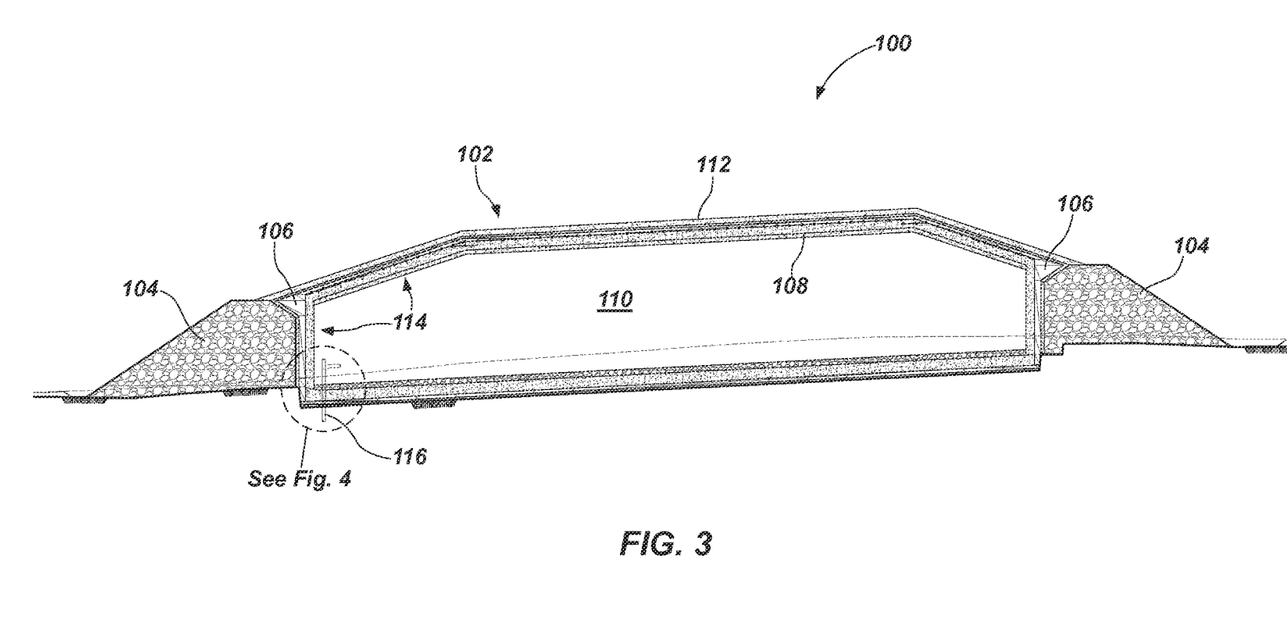
FIG. 3 shows a material recovery system with the fluid sealing system according to an embodiment of the present invention.
Figure 4:
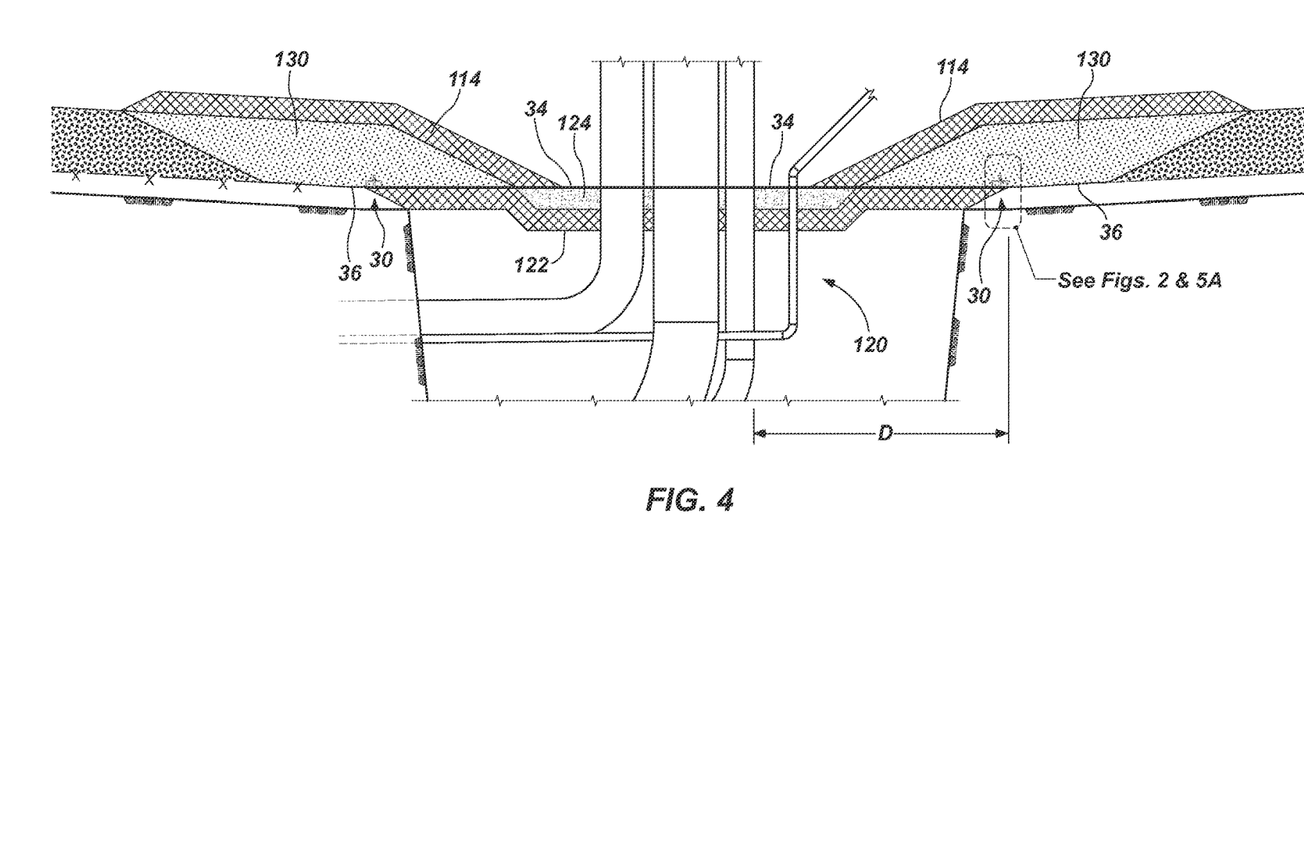
FIG. 4 is a cutaway view of a portion of FIG. 3.

A fluid seal as described herein can provide added resistance to both thermal and chemical deterioration of the fluid seal and associated components. One embodiment of a fluid seal according to the current technology is depicted in FIG. 2. FIG. 2 illustrates a fluid seal 30 that includes an elongated sealing member 32 attached to a bulkhead plate 34. The elongated sealing member 32 biases or clamps a geomembrane 36 to the bulkhead plate 34. An enclosed channel 38 is defined by the elongated sealing member 32 and the bulkhead plate 34. The channel 38 is adapted to receive a slurry 40 to assist with providing a fluid tight seal, which in one aspect is used as a fluid seal around heating, gas collection, and other pipes extending into a material recovery capsule (FIGS. 3 and 4).

Such heating, gas collection, and other pipes can enter the recovery capsule through the bulkhead plate 34. The bulkhead plate can typically have a square or rectangular geometry. However, the bulkhead plate can have any suitable or desirable geometry. Such geometries can include square, rectangular, polygonal, trapezoidal, rhomboidal, elliptical, circular, triangular, or other desirable geometry such as cutouts for obstructions.

Additionally, the bulkhead plate can be made of any suitable material. For example, the bulkhead plate 34 can be a steel plate, although other high temperature composites, metals, or other materials can be used. The bulkhead plate can have any suitable thickness. In one example, the bulkhead plate can have a thickness of from about 0.1 to about 5 cm. In another aspect, the bulkhead plate can have a thickness of from about 0.3 cm to about 3 cm. In another aspect, the bulkhead plate can have a thickness of from about 0.5 cm to about 2.5 cm.

Additionally, a geomembrane 36 can surround and encapsulate gases within the recovery capsule. The geomembrane can act as an additional barrier in the event that another gas barrier layer should fail for any reason. The membrane can also help prevent entrance of air or other undesired gases from outside the capsule. The membrane can comprise a variety of impermeable coverings. The membrane can be made of any suitable material. In some embodiments, the membrane can be selected from high-density polyethylene liners, linear low-density polyethylene liners, polyvinyl chloride liners, polypropylene liners, chlorosulfonated polyethylene liners, ethylene-propylene-diene terpolymer liners, and combinations thereof. In other embodiments, the membrane can comprise a geosynthetic clay liner, woven textiles, nonwoven textiles, or combinations thereof.

The elongated sealing member 32 can assist in providing an effective fluid seal at an interconnection between the bulkhead plate 34 and the geomembrane 36. The elongated sealing member can have any suitable geometry. In the embodiment illustrated by FIG. 2, the elongated sealing member 32 has a substantially u-shaped geometry. However, the elongated sealing member can include a c-shaped, u-shaped, v-shaped, polygonal, trapezoidal, or any other suitable geometry. In one aspect, the elongated sealing member can be formed with a c-channel, a u-channel, or similar channel. Further, the elongated sealing member can be made of a suitable material, such as steel, other high temperature metals and composites, and any other suitable material.

The elongated sealing member 32 interfaces with, is attached to, or is otherwise connected to the bulkhead plate 34 so as to define an enclosed channel 38. As will be discussed in more detail below in connection with FIGS. 5A-5B, the elongated sealing member can have a variety of configurations. Additionally, the enclosed channel 38 can be configured or adapted to receive a slurry 40 therein.

The slurry 40 can provide a fluid tight seal at a site of interconnection between the bulkhead plate 34 and the geomembrane 36. The slurry can include at least one of a sealing fluid, a swelling clay or soil, and a cement. In one aspect, the slurry can comprise a sealing fluid, a swelling clay, and a cement.

The sealing fluid can include any suitable fluid or component. The permeability of the fluid seal 30 can also be affected by the composition of the sealing fluid. In one aspect, the sealing fluid can include a polar solvent such as water. In one aspect, the sealing fluid can include any fluid that induces swelling of a swelling clay or soil. In a further aspect, the sealing fluid can include a modifying component, such as a water-modifying component, that causes at least one of an increase in the boiling temperature of the sealing fluid, an increase in the viscosity of the sealing fluid, a decrease in the vapor pressure of the sealing fluid, a decrease in the evaporation rate of the sealing fluid, and combinations thereof. Non-limiting examples of components, including modifying components, of the sealing fluid can include short chain (C1-C4) carboxylic acids, short chain (C1-C3) alcohols, polyols, water, triethanolamine, triethylamine, and the like. In one specific aspect, the sealing fluid can include water and a water-soluble polyol. Various water-soluble polyols can be used. Exemplary classes of water-suitable polyols include, but are not limited to, acyclic polyols, monoalicyclicpolyols, and cyclicetherpolyols. Suitable acyclic polyols can include glycerin (glycerol), ethylene glycol, propane-1,2-diol (propylene glycol), propane-1,3-diol, butane-1,2-diol, butane-1,3-diol, butane-1,4-diol, butane-2,3-diol, diethylene glycol, triethylene glycol, sorbitol, triethanolamine, and combinations thereof. In a specific embodiment, the water-soluble polyol can be glycerin.

These polyols can be mixed with water and, in some cases, can affect characteristics of the sealing fluid. Effects that can be obtained by mixing polyols with water include, but are not limited to, increasing the boiling point of the sealing fluid over the boiling point of pure water, decreasing vapor pressure of the sealing fluid at an elevated operating temperature, decreasing evaporation rate of the sealing fluid at an elevated operating temperature, modifying viscosity of the sealing fluid, and other effects. Several of these effects can also improve the impermeability of the fluid seal 30.

In some embodiments, the sealing fluid can have a higher boiling point than pure water at STP. As an example, solutions of the polyol glycerin and water can have boiling points ranging from 100° C. (pure water) up to 290° C. (pure glycerin). As another example, solutions of the polyol triethylene glycol and water can have boiling points ranging from 100° C. (pure water) up to 285° C. (pure triethylene glycol). As another example, solutions of the polyol triethanolamine and water can have boiling points ranging from 100° C. (pure water) up to 335° C. (pure triethanolamine). As a general guideline, boiling point of the sealing fluid increases slowly in dilute solutions of these polyols and more quickly at higher concentrations.

The sealing fluid can have various compositional ranges. In one aspect, the sealing fluid can have at least 50 wt %, at least 60 wt %, at least 70 wt %, at least 80 wt %, or at least 90 wt % water. In another aspect, the sealing fluid can include from about 80 wt % to about 100 wt % of water. In another aspect, the sealing fluid can include from about 70 wt % to about 90 wt % of water. In a more specific aspect, the sealing fluid can include from about 70 wt % to about 80 wt % of water. In another more specific aspect, the sealing fluid can include from about 73 wt % to about 77 wt % water. In another more specific aspect, the sealing fluid can include about 75% water.

Additionally, generally the sealing fluid can include from about 0.001 wt % to about 20 wt % of a suitable water-modifying component. In another aspect, the sealing fluid can include from about 10 wt % to about 40 wt % of a suitable water-modifying component. In another aspect, the sealing fluid can include from about 30 wt % to about 50 wt % of a suitable water-modifying component. In a more specific aspect, the sealing fluid can include from about 20 wt % to about 30 wt % of a suitable water-modifying component. In another more specific aspect, the sealing fluid can include about 25 wt % of a suitable water-modifying component. In one aspect, the water-modifying component can be a polyol. In one specific aspect, the water-modifying component can be glycerin.

As previously discussed, the water-modifying component can have numerous effects on the sealing fluid, as will be illustrated through various examples. In one specific example, the sealing fluid can include a composition of glycerin and water. One embodiment includes a solution of about 60 wt % glycerin having a boiling point of about 109° C. Another embodiment includes a solution of about 70 wt % glycerin having a boiling point of about 113.6° C. Yet another embodiment includes a solution of about 80% glycerin having a boiling point of about 121° C. In still another embodiment, a solution of about 95% glycerin having a boiling point of about 164° C. can be used. Solutions of water with other polyols can have other various boiling points. Generally, polyols and other water-modifying components that increase the boiling point of water can be used.

Similarly, adding a polyol or other suitable water-modifying component can decrease the vapor pressure of the sealing fluid compared to pure water at the same temperature. This can also lead to a slower rate of evaporation of the sealing fluid from the slurry. Again, using glycerin as a non-limiting example, one embodiment includes a solution of 60 wt % glycerin having a vapor pressure of 565 mm Hg at 100° C. Another embodiment includes a solution of 70 wt % glycerin having a vapor pressure of 496 mm Hg at 100° C. As will be recognized by one skilled in the art, temperatures other than 100° C. will result in higher or lower vapor pressures at each of the respective concentrations of the glycerin-water solution. Other solutions of water and water-soluble polyols or other water-modifying components can similarly have lower vapor pressures compared to pure water.

In some cases, the water-soluble polyol or other suitable water-modifying component can increase the viscosity of water. Viscosity of these solutions can vary depending both on the concentration of the water-modifying component as well as temperature. Therefore, the concentration of the water-modifying component in the solution can be optimized depending on the temperature at the fluid seal and the desired viscosity of the sealing fluid. Without being bound to a specific mechanism, it is believed that increasing viscosity of the sealing fluid can increase the impermeability of the fluid seal and associated slurry because the more viscous solution can resist opening of pathways for advective fluid flow through the fluid seal as well as decreasing rates of diffusion through the fluid seal.

As explained above, different concentrations of the sealing fluid components can provide different effects on the properties of the sealing fluid. Therefore, the concentration can be selected depending on the desired effect and the design parameters of the fluid seal. For example, vapor pressure of the solution tends to decrease with increasing polyol concentration. Additionally, viscosity tends to increase with increasing polyol concentration. Increasing viscosity can make the fluid seal less permeable, but at extremely high viscosities the solution may be more difficult to work with, especially when it is added to additional slurry components. All of these effects can be considered and balanced when selecting a concentration of the various components in the sealing fluid.

In some cases, a modifying component can be added to increase or enhance the swelling of a swelling clay or soil. For example, some swelling clays or soils can swell more when the pH of the sealing fluid is low. Accordingly, in one aspect, the sealing fluid can include a short chain carboxylic acid or other suitable acid to reduce the pH of the sealing fluid and aid in the swelling of the swelling clay or soil.

As previously discussed, the slurry can also include a swelling clay or soil. Any suitable swelling clay or soil can be used. Some non-limiting examples of swelling clays and soils that can be used with the current technology include bentonite, montmorillonite, kaolinite, illite, chlorite, vermiculite, combinations thereof. In one specific embodiment, the swelling clay is a bentonite clay. In some cases the slurry can include a mixture of swelling clay and soil. As a general guideline, when present, soil content can range from about 5% to 50%, although other soil contents can be suitable.

Additionally, the slurry can include a cement. Some non-limiting examples of cements that can be used with the current technology include gray and white portland cement, calcium aluminate cement, expansive cement, combinations thereof, and any other suitable cements.

As previously mentioned the slurry 40 (FIG. 2) can include at least one of a sealing fluid, a swelling clay, and a cement. The slurry 40 can also include each of a sealing fluid, a swelling clay, and a cement. In one aspect, the slurry can have a target specific gravity of about 1.4 to 2.0. In one aspect, the slurry can have a target specific gravity of about 1.6 to 1.8. In one specific example, a specific gravity of from about 1.6 to about 1.8 can be achieved with a sealing fluid at a 75:25 ratio of water to glycerin, where the solid content is 96% cement and 4% bentonite.

Referring again to FIG. 2, the fluid seal 30 can also include one or more compression plates. For example, a pair of compression plates 42*a*, 42*b* can be positioned between the elongated sealing member 32 and the bulkhead plate 34. Although other materials can be used, generally the compression plates can each be formed of a high temperature metal, such as steel, which maintains structural integrity up to operating temperatures for the capsule. Typically operating temperatures range up to about 750° F., and in some cases up to 900° F. Other high temperature metals and composites can also be used.

Additionally, the fluid seal 30 can include at least one gasket. For example, a pair of gaskets 44a, 44b can be positioned between respective compression plates 42a, 42b and the bulkhead plate 34. The gaskets can be made of any suitable material. In one aspect, the gasket can be made of an elastomeric material, such as perfluoroelastomers, fluoroelastomers, fluoro silicone rubbers, silicone rubbers, polyacrylic rubbers, ethylene-vinyl acetates, chlorosulfonated polyethylenes, ethylene propylene rubbers, and any other suitable elastomeric material. In one specific embodiment, the gaskets are elastomeric gaskets coated with a polyol, such as glycerin.

As illustrated in FIG. 2, the geomembrane 36 is positioned or clamped between the right gasket 44a and the right compression plate 42a. It is noted that the presence of the compression plates, gaskets, and geomembrane do not interfere with the formation of the enclosed channel defined by the elongated sealing member and the bulkhead plate. In embodiments that include compression plates and gaskets, these features also define a portion of the enclosed channel and are considered extensions of the bulkhead plate and/or the elongated sealing member.

In most cases, the elongated sealing member 32 is clamped to the bulkhead plate 34 by a fastener 46 extending through the channel 38. A bolt support plate 48 is attached to the bulkhead plate 34 and to an end of the fastener 46. In one embodiment the fastener 46 is a Nelson stud fastener tightened to clamp the geomembrane 36 to the bulkhead plate 34. Other suitable fasteners or fastening systems can also be used to clamp the member 32 to the bulkhead plate 34.

A fluid conduit 50 can be coupled to the elongated sealing member 32 and can extend into the enclosed channel 38. The fluid conduit 50 is configured to deliver the slurry 40 into the enclosed channel 38 after the elongated sealing member 32 is clamped to the bulkhead plate 34. The fluid conduit 50 may be a grouting nipple tapped into the channel 38 through an aperture in the elongated sealing member 32. In one aspect, the fluid conduit 50 can be used to charge or infuse the enclosed channel with slurry and be subsequently disconnected and sealed to prevent or minimize desiccation of the slurry. In another aspect, the fluid conduit 50 can be used to charge or infuse the enclosed channel with slurry and be subsequently left connected. This can allow periodic infusion of additional sealing fluid, water, and/or other re-wetting solvent to prevent or minimize desiccation of the slurry. In this aspect, the fluid conduit can be connected to an exterior re-wetting system via the bulkhead plate 34.

An outer perimeter area 52 above the elongated sealing member 32 can be filled with a compacted layer of clay amended soil (labeled GCAS). This is typically done after the slurry 40 has been introduced into the enclosed channel 38 due to the viscosity of the slurry 40 and the difficulty of pumping the slurry over extended distances. However, the slurry 40 can be introduced after the GCAS has been filled into the outer perimeter area 52. In one example, the GCAS material has a fluid mixture ratio of water and a polyol of between 5:95 and 75:25. In one aspect, the polyol is glycerin. The solids (by dry mass) of the GCAS can often be about 10% to 20% clay and between 90% and 80% granular soil. By total mass, the hydrated mixture is often 10% to 18% fluid, and 90%-82% solids, although other proportions can be suitable.

Glycerin and other polyols can have a higher boiling point than water and a viscosity that is much greater than water (i.e. glycerin has a viscosity that is over 1000 times greater than water). Thus, mixing polyols with clayey soil allows the soil to tolerate higher temperatures before the sealing fluid vapor point is reached, which provides the GCAS material improved resistance against desiccation. Additionally, the higher polyol and water viscosity reduces the permeability of the GCAS material, thereby improving its fluid seal properties.

The compacted layer of GCAS overlies and compresses the elongated sealing member 32 and the bulkhead plate 34 adjacent the member 32 (see FIG. 4). When the plate 34 and the seal 30 are buried, the sheer mass of the hydrocarbonaceous ore thereabove causes the polyol and water to be squeezed from the GCAS onto, and all around, the fluid seal 30 and the bulkhead plate 34, rendering the interface between the geomembrane 36 and the bulkhead plate 34 fluid tight. To assist with such sealing, a sealing fluid can be applied in liquid form to the bulkhead plate 34 prior to overlaying the GCAS on top. In one aspect, the sealing fluid can include water and a polyol, such as glycerin.

FIGS. 3, 4, 5A, and 5B illustrate a hydrocarbon material recovery system 100 according to an embodiment of the present technology. Note that the aforementioned fluid seal 30 is used with the system 100 to provide a fluid seal (FIG. 4), and is discussed further below.

More particularly, FIG. 3 shows a hydrocarbon material recovery capsule 102 generally surrounded by bedrock or earthen berms 104 on the sides and bottom of the capsule 102. A gas containment system 106 is adjacent the berms 104 and defines an interior volume 108 of the material recovery capsule 102. The gas containment system 106 is comprised of compacted CAS or natural clayey soil, and the geomembrane surrounds the gas containment system 106 (FIG. 4). The interior volume 108 is filled with a stationary mass of hydrocarbonaceous material 110. The hydrocarbonaceous material can often be oil shale, although other materials can include coal, tar sands, peat, biomass, and the like. Further, the hydrocarbonaceous material is generally crushed material having a particulate size ranging from about 0.5 cm to about 60 cm, depending on materials and desired operating conditions (e.g. porosity, void volumes, etc). Cover material 112 overlies the top of the gas containment system 106, and an insulation material 114 lies adjacent, and interior to, the gas containment system 106. The cover material can generally be overburden or other earthen material which provides additional lithostatic pressure and integrity to upper insulation and membrane layers. Other layers of material may be used but will not be discussed in detail. Additional details regarding one exemplary variation of the capsule can be found in U.S. Pat. No. 7,862,705 and U.S. Patent Application Publication No. 2013/0334106, which are each incorporated by reference.

At least one pipe 116 extends into the internal area of the gas containment system 106 through a bulkhead plate 34, which may be on a vertical or horizontal wall of the capsule. As can be appreciated from FIG. 4 (showing a closer view of the cutaway of FIG. 3) a collection of heating pipes 120 extends through an insulation layer 122 and a concrete layer 124 of the capsule 102. The pipes 120 may be relatively large heating pipes (up to a 36-inch inner diameter) that deliver gas to, and withdraw gas from, the gas containment system 106. Further, such pipes can be used to circulate heating fluids in a closed heating loop, or through direct injection into the containment system. Surrounding the pipes 120 and attached to the bulkhead plate 34 are perimeter fluid seals 30 interconnected to each other and clamping the geomembrane 36 to the plate 34, which is best illustrated on the schematic top plan view of FIG. 5B (discussed further below).

With continued reference to FIG. 4, a layer of GCAS 130 overlies the fluid seals 30 and compresses the seals 30 and the plate 34, as discussed above. The layer of GCAS 130 is most often approximately three feet thick at its thickest point. However, the GCAS layer can have any suitable thickness, such as from about 1 foot to about 5 feet, from about 2 feet to about 4 feet, or from about 2.5 feet to about 3.5 feet thick. An insulation layer 114 overlies a portion of the concrete layer 124 and overlies the GCAS 130. The insulation layer 114 can be formed of insulation which is capable of withstanding the high operating temperatures. Non-limiting examples of suitable insulation material can include a water soaked particulate layer, and the like. [Are there any other suitable insulation materials that should be included here?] As previously discussed, the bulkhead plate 34 is most often a relatively large, rectangular steel plate positioned between the insulation layer 122 and the GCAS 130 at the perimeter of the plate 34; of course, the seals 30 are above the plate 34 and extend along the perimeter of the plate 34 (FIG. 5A).

As discussed above, the temperature of the heating pipes 120 can be upwards of 900 degrees Fahrenheit. Exposure to such high temperatures of the gas containment system 106 and at the interconnection between the bulkhead plate 34 and the fluid seals 30 can cause desiccation of clayey materials and heating of the geomembrane beyond its transition temperature. Thus, the seals 30 are positioned a sufficient distance D from and around the pipes 120 to minimize the risk of damage or fluid leaks at the interconnection between the plate 34 and the geomembrane 36. Although optimal operating parameters can vary, this distance D is often between 0.5 and 8 feet. However, the distance D can be any suitable distance, such as from about 0.5 feet to about 15 feet, from about 0.75 feet to about 10 feet, or from about 1 foot to about 5 feet.

Figure 5A:
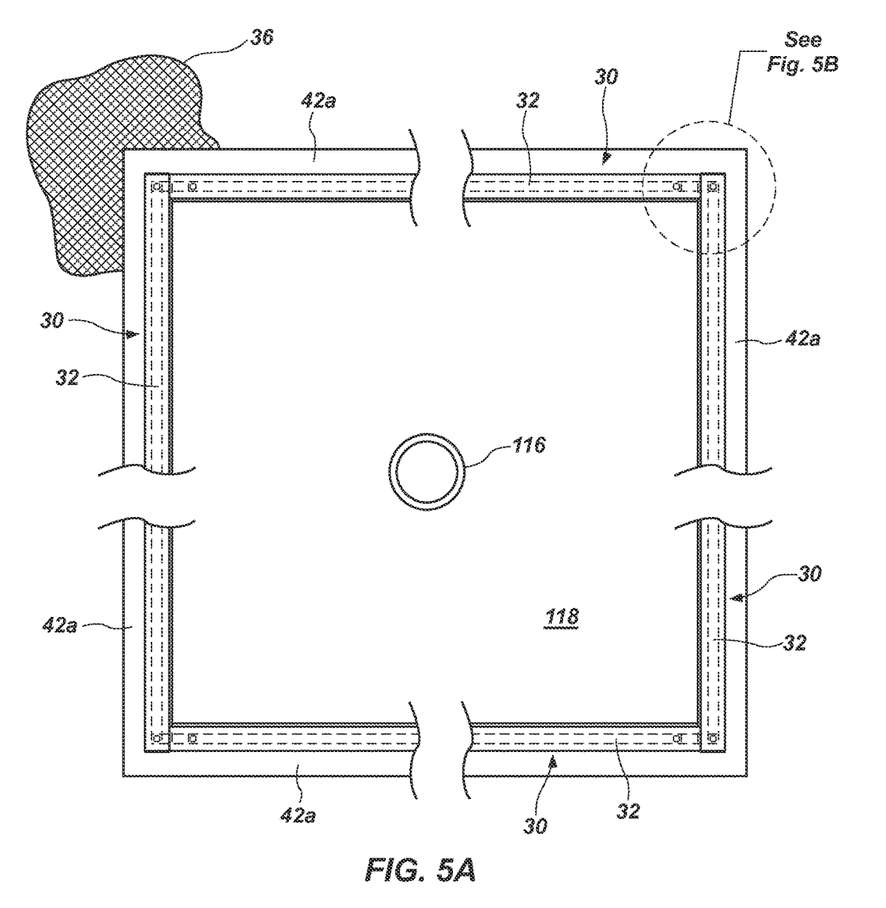
FIG. 5A is a top plan schematic view of a portion of FIG. 4.
Figure 5B:
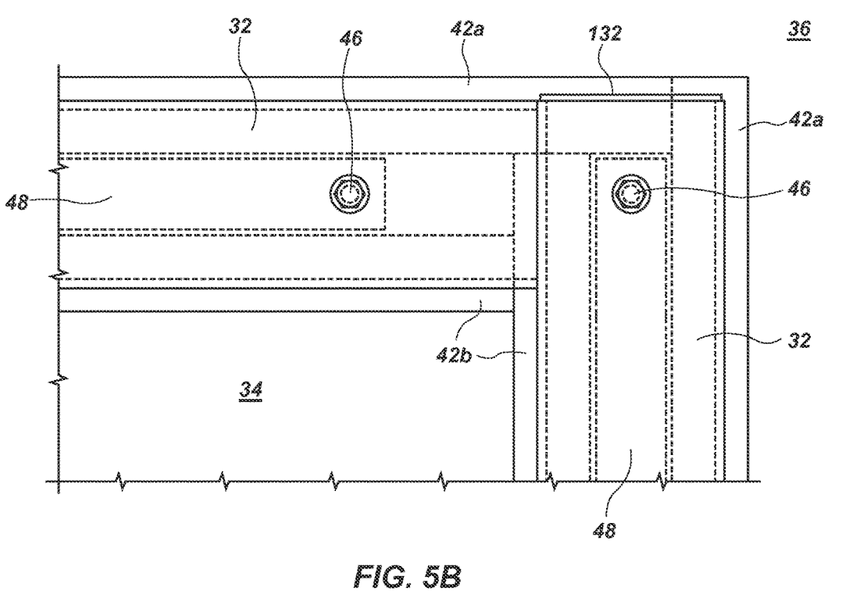
FIG. 5B is a cutaway view of a portion of FIG. 5A.

With reference to FIGS. 5A and 5B, a top plan schematic view is illustrated of the arrangement of the bulkhead plate 118 and the fluid seals 30. At least one pipe 116 extends through the bulkhead plate 118 (i.e. item 34 in FIGS. 2 and 4). Although four such fluid seals are illustrated, other numbers of seals (e.g. 1, 2, 3, 5, 6, 7, 8, etc) can be used to form a perimeter about the bulkhead plate 34. For example, more than four fluid seals can be used because the bulkhead plate has greater than four perimeter edges (i.e. polygonal bulkhead plate). Also, where desirable, more than one fluid seal can be used along a single perimeter edge of the bulkhead plate. Further, although more expensive to manufacture, one or more curved fluid seals can be used to form a fluid seal across all perimeter edges or areas of connection between the geomembrane and bulkhead plate. Thus, a variety of configurations can be used to provide a fluid seal along the area of interconnection between the geomembrane and the bulkhead plate.

The elongated sealing member 32 of each fluid seal 30 can be interconnected to an adjacent member 32 at about a ninety-degree orientation, if the bulkhead plate has a square or rectangular geometry. However, as previously mentioned, the bulkhead plate can have a variety of geometries such that the elongated sealing member 32 can be manufactured to accommodate such geometry. Further, the term interconnected does not necessarily mean that the enclosed channels 38 defined by the elongated sealing members 32 are fluidly connected, although they can be fluidly connected. In one aspect, the enclosed channels defined by each of the elongated sealing members 32 are each fluidly interconnected to one another. In another aspect, at least one enclosed channel is fluidly connected to at least one adjacent enclosed channel. In another aspect, the enclosed channels defined by each of the elongated sealing members 32 are not fluidly interconnected to one another. However, whether the enclosed channels are fluidly interconnected or not, the various elongated sealing members must be sufficiently interconnected to provide a fluid tight seal at the area of interconnection between the bulkhead plate 118 (or 34) and the geomembrane 36.

FIG. 5B shows a closer view of the interconnection points between adjoining elongated sealing members. The elongated sealing members 32 can be interconnected to one another. As illustrated in the embodiment of FIGS. 5A and 5B, a separate elongated sealing member can be used for each of four perimeter edges of a square or rectangular bulkhead plate 118 (34). A first and third elongated sealing member can each extend along a length of parallel perimeter edges of the bulkhead plate 118 (34). An end cap 132 can be attached to each of the exposed ends of the first and third elongated sealing members 32. A second and fourth elongated sealing member can run along a length of the two remaining perimeter edges of the bulkhead plate 118 (34) such that the ends of the second and fourth elongated sealing members interface with or abut the first and third elongated sealing members towards the ends thereof and at corresponding inside edges, the inside edges being proximate to the at least one heating pipe. In another aspect, each of the elongated sealing members 32 can be adapted or configured to include an end cap 132 to cap only one end thereof. The end opposite the capped end of each of the elongated sealing members can be configured or adapted to interface with or abut an adjacent elongated sealing member towards the capped end thereof and at an inside edge thereof, the inside edge being proximate to the at least one heating pipe. In yet another aspect, each of the elongated sealing members 32 can be adapted or configured to interface with or abut two adjacent elongated sealing members to provide a fluid tight seal without the use of an end cap 132. In one example, where the bulkhead plate has a square or rectangular geometry, the elongated sealing members can be manufactured to have an inside edge that is shorter than an opposing outside edge. Two opposing lateral edges can connect the inside edge and the opposing outside edge at a perimeter of the elongated sealing member. The inside edge, the outside edge, and two opposing lateral edges of the elongated sealing member form a substantially trapezoidal geometry, wherein the two opposing lateral edges can be oriented at approximately 45° and 135° angles relative to the outside edge of the elongated sealing member. Thus, adjacent elongated sealing members 32 can be attached at substantially right angles to follow the perimeter of a square- or rectangular-shaped bulkhead plate and provide a fluid seal at the area of intersection between the bulkhead plate and the geomembrane. As will be recognized by one skilled in the art, various other methods of connecting the elongated sealing members can be used. Further, it is noted that for the sake of brevity, the examples provided above are adapted for a square- or rectangular-shaped bulkhead plate, but can be modified accordingly to accommodate a bulkhead plate having edges angled at an angle other than 90°.

Fasteners 46 clamp or attach each elongated sealing member 32 to the bulkhead plate 34 via respective bolt support plates 48, such as described with reference to FIG. 2. As discussed above in greater detail, compression plates 42a, 42b are clamped down by respective elongated sealing members 32 and fasteners 46, thereby coupling the geomembrane 36 to the bulkhead plate 34.

These drawings are provided to illustrate various aspects of the invention and are not intended to be limiting of the scope in terms of dimensions, materials, configurations, arrangements or proportions unless otherwise limited by the claims.

What is claimed is:

1. A fluid seal for a material recovery capsule, the fluid seal comprising:
   an elongated sealing member attached to a bulkhead plate and biasing a geomembrane to the bulkhead plate; and
   an enclosed channel defined by the elongated sealing member and the bulkhead plate, the channel adapted to receive a slurry that provides a fluid tight seal for the material recovery capsule, wherein the elongated sealing member is a C-channel clamped to the bulkhead plate by a fastener extending through the channel.

2. The fluid seal of claim 1, wherein the slurry comprises a sealing fluid, a swelling clay, and a cement.

3. The fluid seal of claim 1, wherein the slurry comprises glycerin, water, bentonite, and a cement.

4. The fluid seal of claim 1, comprising:
   a compression plate positioned between the elongated sealing member and the bulkhead plate; and
   a gasket positioned between the compression plate and the bulkhead plate, whereby the geomembrane is positioned between the gasket and the compression plate.

5. The fluid seal of claim 1, wherein an outer perimeter of the elongated sealing member is positioned adjacent a compacted layer of clay amended soil and is adapted to be compressed by the compacted layer of clay amended soil, thereby providing a fluid seal between the geomembrane and the bulkhead.

6. The fluid seal of claim 1, comprising a fluid conduit coupled to the elongated sealing member and extending into the channel, the fluid conduit adapted to deliver the slurry into the channel.

7. A material recovery system comprising a plurality of fluid seals as in claim 1, the plurality of fluid seals interconnected to each other and surrounding at least one pipe extending through the bulkhead plate, whereby each of the plurality of fluid seals bias the geomembrane to a perimeter area of the bulkhead plate.

8. The system of claim 7, wherein the plurality of fluid seals is four fluid seals.

9. A material recovery system, comprising:
   a material recovery capsule having a gas containment system defining an interior volume of the material recovery capsule;
   a bulkhead plate adjacent the gas containment system, the bulkhead plate having an aperture and a perimeter area;
   at least one pipe extending through the aperture in the bulkhead plate and into the material recovery capsule;
   a geomembrane overlying the perimeter area of the bulkhead plate and laying exterior of the gas containment system;
   a fluid seal comprising an elongated sealing member attached to the bulkhead plate around the perimeter area, the fluid seal biasing the geomembrane to the bulkhead plate; and
   an enclosed channel defined between the elongated sealing member and the bulkhead plate, the channel filled with a slurry that provides a fluid tight seal for the material recovery capsule.

10. The system of claim 9, wherein the slurry comprises glycerin, water, bentonite, and cement.

11. The system of claim 9, wherein the fluid seal includes:
    a compression plate positioned between the elongated sealing member and the bulkhead plate; and
    a gasket positioned between the compression plate and the bulkhead plate, whereby the geomembrane is positioned between the gasket and the compression plate.

12. The system of claim 9, wherein the elongated sealing member is a C-channel clamped to the bulkhead plate by a fastener extending through the channel.

13. The system of claim 9, comprising a compacted layer of clay amended soil surrounding the fluid seal, thereby providing a fluid tight seal between the geomembrane and the bulkhead.

14. The system of claim 9, comprising the four fluid seals interconnected to each other and surrounding the at least one pipe, whereby each of the four fluid seals bias the geomembrane to the perimeter area of the bulkhead plate.

* * * * *